Patented Mar. 22, 1949

2,465,318

UNITED STATES PATENT OFFICE 2,465,318

POLYMERIZATION PRODUCTS OF PIPERYLENE AND ITS METHYL HOMOLOGUES, AND UNSATURATED NITRILES

Raymond B. Seymour, Dayton, Ohio, assignor to Monsanto Chemical Company, a corporation of Delaware No Drawing. Application July 8, 1943, Serial No. 493,864

9 Claims. (Cl. 260—78.5)

The present invention relates to copolymerization products, more particularly to copolymerization products of 1-methyl-1,3-butadiene or mono-methyl derivatives thereof and certain unsaturated nitriles, and to methods of producing the same.

According to the present invention, piperylene or the mono-methyl homologues thereof are copolymerized with unsaturated nitriles having the general structure:

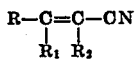

wherein R is a substituted or unsubstituted phenyl radical or a cyano group and $R_1$ and $R_2$ represent hydrogen or a radical selected from the group consisting of aryl radical, alkyl radical, cyano radical, halogen or the group COOX, where X denotes an alkyl radical of from 1 to 5 carbon atoms.

As examples of the diene compounds which may be employed may be mentioned 1-methyl-1,3-butadiene (piperylene), 2-methylpiperylene, 3-methylpiperylene and 4-methylpiperylene.

Examples of the unsaturated nitriles which are employed for the present purpose are the following: cinnamonitrile, alpha-methylcinnamonitrile, beta-methylcinnamonitrile, alpha-phenylcinnamonitrile, beta-phenylcinnamonitrile, benzalmalononitrile, beta-cyanocinnamonitrile, alpha-halogen cinnamonitrile, beta-halogen cinnamonitrile (of which the chlorine, bromine and fluorine compounds are to be considered the "halogen" compounds), alpha-cyano alkyl cinnamate, beta-carbalkoxycinnamonitrile (in which the alkyl group is formed by esterification, employing aliphatic alcohols having from 1 to 8 carbons), fumaronitrile, 1-alkyl fumaronitrile, (in which the alkyl group may have from 1 to 8 carbon atoms), 1-cyanofumaronitrile, 1-halogen fumaronitrile (in which the halo substituent may be chlorine, bromine or fluorine), and 1 to 8 carbon alcohol esters of alpha, beta-dicyanoacrylic acid.

The phenyl group of the cinnamonitrile derivatives and also the phenyl group of benzalmalononitrile may contain substituents such as alkyl groups, also chlorine, bromine and fluorine or cyano groups.

The diene hydrocarbons mentioned above as well as the present unsaturated nitriles are both materials which undergo little if any polymerization when submitted, alone, to ordinarily employed polymerizing conditions. It is well known that the introduction of methyl radicals into butadiene in positions other than the 2- and 3- positions slows down the polymerization rate. For example, Whitby and Crozier (Canadian Journal of Research, 6,203 (1932)) have found that while isoprene, after only 12.5 hours at a temperature of 45° C., yields 54.7% of dimer and 15.56% of higher polymer, 1-methyl-1,3-butadiene under much more drastic conditions, i. e., after a time of 15 days at a temperature of 150° C., yielded 73% of dimer and 27% of a higher polymer having an average molecular weight of only 1002. In my experimental work I have attempted to polymerize the unsaturated nitriles of the general formula given above under a variety of polymerizing conditions and have been unable to effect any polymerization of the same. Both the present diene hydrocarbons and the present unsaturated nitriles may, therefore, be regarded as substantially unpolymerizable compounds.

Now I have found, however, that when 1-methyl-1,3-butadiene (piperylene) or its mono-methyl derivatives is submitted to polymerizing conditions in the presence of the unsaturated nitriles defined above, an extremely rapid polymerization takes place, especially when polymerization is effected in emulsion. By such a method I obtain high yields of thermoplastic products. The temperature of polymerization may vary between 25° C. and 100° C. depending upon the character of the product desired. The polymerization may be conducted either in the presence or absence of catalysts inducing polymerization. Where catalysts are employed they may comprise the oxygen yielding type such as benzoyl peroxide, tert-butyl hydroperoxide, ammonium persulfate, sodium perborate or hydrogen peroxide. Where polymerization is carried out by the aqueous emulsion or suspension method, water soluble catalysts are employed. When the polymerization is carried out in mass or in non-aqueous organic solvents, catalysts are chosen which are soluble in the monomer or in the respective organic solvents employed.

The present copolymers are colorless, transparent, thermoplastic products containing substantially no cross-linkages. They can be readily molded and remolded. They are characterized by high resistance to organic solvents, great thermal stability and a very high degree of resistance to impact. In general, copolymerization of 1-methyl-1,3-butadiene or its mono-methyl substituents with, say from 5% to 50% by weight and preferably from 10% to 40% of the unsaturated nitrile results in the production of polymerization products possessing an impact resistance which far exceeds that of other known transparent, thermoplastic, molded materials, for example, that of polystyrene or known copolymers of polystyrene. The present products are insoluble or substantially unaffected by the usual organic solvents such as benzene, gasoline, alcohol, acetone, carbon tetrachloride, etc.

As clear, transparent, thermoplastic materials of excellent mechanical strength, the present copolymers may be advantageously employed for the production of transparent objects such as windshields and the like, or for transparent molded articles, for insulating materials, etc.

For the preparation of clear, transparent products I prefer to employ the unsaturated nitrile in amounts of, say, from 10% to 40% of the total monomeric mixture, although I may use from 5% to 50% of the nitrile. The copolymerization may be effected in mass, in aqueous emulsion or suspension, or in a solvent medium such as 1,4-dioxane, either in the presence of absence of a catalyst of polymerization. During or prior to the polymerization there may be added to the polymerizing mixture or to the initial mixture of monomers such materials as plasticizers, coloring materials, fillers, etc. The inclusion of such additives in low amounts has substantially no effect on the course of the polymerization, the production of the modified resins being achieved under conditions which are substantially those employed in the polymerization of the monomeric mixture in absence of said modifying agents.

The invention is further illustrated, but not limited, by the following examples:

Example 1

64 g. of a mixture comprising 70 parts by weight of 1,3-dimethyl-1,3-butadiene and 30 parts by weight of fumaronitrile is emulsified to a fine milk in a mixture comprising 37.5 ml. of a MacIlvaine's buffer solution held at a pH of 6% or slightly less, 37.5 ml. of a 5% aqueous solution of Gardinol WA, 0.5 g. of sodium perborate and 1.5 g. of carbon tetrachloride. The emulsion was shaken at a temperature of 35° C. for 40 hours and poured into alcohol. The precipitated copolymer, after filtration, washing with water and drying, was a white powder, obtained in 90% yield, having a nitrogen content of 9.65%, a softening point of 143° C., and a melting point of 200° C. It was completely unaffected by gasoline, carbon tetrachloride, and alcohol but was soluble in acetone and ethylene dichloride.

When submitted to a hot molding operation, molded test specimens of the copolymer showed the following mechanical properties:

Tensile strength _____ 7,230 lbs./sq. in.
Flexural strength ____ 14,400 lbs./sq. in.
Impact strength _____ over 30 (arbitrary units)

The above value for tensile strength was determined by employing a model J-2 Scott tester and a test piece of the copolymer measuring 0.08" x 0.5" x 2". The above value for flexural strength was determined by employing a test piece measuring 0.08" x 0.5" x 1.0" and a model J-2 Scott tester, which tester had been modified by a special support having curved edges with a radius of 0.0625" and spaced at a distance of 0.625", the test piece being laid flat on said supports. Evaluation of the impact strength was made by employing a modification of the cantilever beam (Izod) impact machine described in the American Society for Testing Materials, Specification D256-41T and found on pages 339 to 342 of the American Society for Testing Materials, Book of Standards, 1941 Supplement, volume III. The great toughness of the present copolymer is evident when its impact strength is compared to that of polystyrene resins. While the impact strength of most polystyrenes ranges from, say, 8 to 11 arbitrary units, that of the present copolymer is over 30 arbitrary units, both values being obtained by employing the same testing procedure.

When 1,3-dimethyl-1,3-butadiene, alone was submitted to the polymerizing conditions described above, there was obtained only approximately 10% yield of a low-molecular weight polymer.

Example 2

Employing the conditions of polymerization described in Example 1, a 1:1 mixture in parts by weight of 1,3-dimethyl-1,3-butadiene and fumaronitrile was copolymerized. The copolymer, which was obtained in a yield of over 90%, had a nitrogen content of 13.3% and the solubility characteristics of the copolymer obtained in Example 1. Evaluation of the mechanical properties of this copolymer, conducted according to the procedures described above, gave the following results:

Tensile strength _____ 6,500 lbs./sq. in.
Flexural strength _____ 10,400 lbs./sq. in.
Impact strength _____ 18 (arbitrary units)

Example 3

Following the conditions of polymerization employed in Example 1, 64 g. of a mixture consisting of 70 parts of piperylene and 30 parts of fumaronitrile was copolymerized. The resulting copolymer, obtained in an 80% yield, had a softening point of 130° C., a melting point of over 200° C., and was insoluble in the usual organic solvents. Evaluation of the mechanical properties of the molded copolymer, gave the following results:

Tensile strength _____ 8,000 lbs./sq. in.
Flexural strength _____ 16,400 lbs./sq. in.
Impact strength _____ greater than 30 (arbitrary units)

Example 4

This example shows the solution copolymerization of 1,3-dimethyl-1,3-butadiene and fumaronitrile. A 25% ethylene chloride solution of a mixture consisting of 60 parts of the diene and 40 parts of the nitrile was maintained for a time of 2 days at a temperature of 70° C. The resulting copolymer, upon precipitation from alcohol, had a softening point of 125° C., a melting point of over 200° C., and was soluble in ethyl acetate, acetone and ethylene dichloride.

Example 5

This example shows mass copolymerization of 1,3-dimethyl-1,3-butadiene and fumaronitrile. A mixture consisting of 70 parts of the diene and 30 parts of the nitrile was copolymerized by maintaining it at a temperature of 70° C. for 14 days. The resulting copolymer, which had a nitrogen content of 11.96%, was a hard, tough, transparent resin having a softening point of 120° C. and a melting point of 170° C. It was insoluble in the usual organic solvents.

On the other hand, when 1,3-dimethyl-1,3-butadiene, alone, was kept at a temperature of 70° C. for 14 days, there was no evidence of polymer formation.

Example 6

64 g. of a mixture consisting of 70 parts of 1,3-dimethyl-1,3-butadiene and 30 parts of benzalmalonitrile was copolymerized according to the emulsion polymerization procedure described in Example 1. There was thus obtained a copolymer having a nitrogen content of 6.27% and a softening point of 117° C. It was insoluble in the usual organic solvents.

Example 7

A mixture containing 7 parts of 1,3-dimethyl-1,3-butadiene, 3 parts of fumaronitrile, 100 parts 95% ethyl alcohol and 0.05 part of benzoyl peroxide was heated at 60° C. After 10 hours of heating a precipitate of copolymer was deposited from the solution. Additional quantities of the monomers and catalyst were then added to the alcohol solution, the monomers being added in the ratio and in the quantity corresponding to that removed in the precipitate. In this manner a precipitated copolymer of substantially constant composition may be obtained.

After removal from the alcohol solution, the precipitated copolymer was dissolved in ethylene dichloride, a plasticizer added to the solution (7 parts of precipitated copolymer to 3 parts of a plasticizer such as Santicizer 8—a mixture of ortho- and para-toluene sulfonamides) and the solution cast into films. The films were clear, strong and highly extensible. Such a solution may also be spun into filaments by being forced through a spinneret.

From the above example and descriptions it is apparent that 1,3-dimethyl-1,3-butadiene may be copolymerized with fumaronitrile according to a variety of polymerizing procedures. The polymerization may be effected batch-wise or continuously, for example, by solvent polymerization in a liquid media which is a solvent for the monomeric mixture and a non-solvent for the copolymers formed.

Although the above specific examples are restricted to the copolymerization of 1,3-dimethyl-1,3-butadiene with fumaronitrile or benzalmalononitrile or to the copolymerization of piperylene with fumaronitrile, copolymers of high impact strength, good thermal properties and resistance to organic solvents are obtainable by the copolymerization of these dienes or of 1,1-dimethyl-, 1,2-dimethyl-, 1,4-dimethyl-1,3-butadiene with an unsaturated nitrile having the general formula herein disclosed. As the unsaturated nitrile component of the monomeric mixture of diene and nitrile there may be employed, for example, any of the unsaturated nitriles mentioned above.

While this invention contemplates principally the copolymers from a binary polymerizable mixture of 1-methyl-1,3-butadiene or its monomethyl derivatives and one of the previously defined unsaturated nitriles, it also includes copolymers from ternary or polynary polymerizable mixtures comprising the diene, the unsaturated nitrile, and one or more additional polymerizable materials such as butadiene, vinyl chloride, acrylonitrile, styrene, alpha-alkyl substituted styrenes, halogenated styrenes, methacrylonitrile, methyl methacrylate, maleic anhydride, etc.

It will be understood that the examples and other details set forth in the specification are presented to enable ready adaptation of the invention to actual practice, and that the invention is not restricted to the details of this disclosure except as required by the appended claims.

What I claim is:

1. The process for producing products which when molded are colorless, transparent and thermoplastic and possess an impact strength in excess of that possessed by molded polystyrene, which comprises heating to a temperature between 25° C. and 100° C. a monomeric mixture consisting of two components, one component thereof being selected from the group consisting of piperylene and its monomethyl homologues and the other component which constitutes at least 5% but less than 50% by weight of the said mixture being a nitrile having the structure:

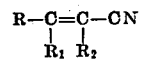

where R is selected from the group consisting of phenyl and CN and $R_1$ and $R_2$ together are selected from the group consisting of H and H, H and X, X and H, H and phenyl, phenyl and H, H and CN, CN and H, H and halogen, halogen and H, H and COOX, COOX and H, where X is an alkyl group of 1 to 8 carbon atoms and said halogen is selected from the group consisting of chlorine, bromine and fluorine.

2. The process defined in claim 1 in which the polymerization is carried out in an aqueous emulsion.

3. The process defined in claim 1 in which the polymerization is carried out in the presence of an oxygen yielding polymerization catalyst.

4. The process defined in claim 1 in which the mixture of compounds undergoing polymerization contains between 10% and 40% by weight of said nitrile.

5. The process for producing products which when molded are colorless, transparent and thermoplastic and possess an impact strength in excess of that possessed by molded polystyrene which comprises heating to a temperature between 25° C. and 100° C. a mixture of monomers consisting of piperylene and fumaronitrile, said mixture containing between 5% and 50% by weight of fumaronitrile.

6. A copolymer consisting of two interpolymerized components, one component thereof being selected from the group consisting of piperylene and its monomethyl homologues and the other component which constitutes at least 5% but less than 50% by weight of said copolymer being a nitrile having the structure:

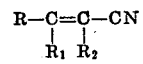

wherein R is selected from the group consisting of phenyl and CN, and $R_1$ and $R_2$ together are selected from the group consisting of H and H, H and X, X and H, H and phenyl, phenyl and H, H and CN, CN and H, H and halogen, halogen and H, H and COOX, COOX and H where X is an alkyl group of from 1 to 8 carbon atoms and said halogen is selected from the group consisting of chlorine, bromine and fluorine; said copolymer when molded being colorless, transparent and thermoplastic and possessing an impact strength in excess of that of molded polystyrene.

7. A copolymer of piperylene and fumaronitrile, said copolymer consisting of from 5% to 50% by weight of copolymerized fumaronitrile, the balance thereof being copolymerized piperylene, said copolymer when molded being colorless, transparent and thermoplastic, and possessing an impact strength in excess of that of molded polystyrene.

8. A copolymer consisting of two interpolymerized components, one component thereof being selected from the group consisting of piperylene and its monomethyl homologues and the other component which constitutes at least 30% but less than 50% by weight of said copolymer being a nitrile having the structure:

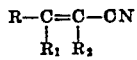

wherein R is selected from the group consisting of phenyl and CN, and $R_1$ and $R_2$ together are selected from the group consisting of H and H, H and X, X and H, H and phenyl, phenyl and H, H and CN, CN and H, H and halogen, halogen and H, H and COOX, COOX and H where X is an alkyl group of from 1 to 8 carbon atoms and said halogen is selected from the group consisting of chlorine, bromine and fluorine; said copolymer when molded being colorless, transparent and thermoplastic and possessing an impact strength in excess of that of molded polystyrene.

9. A copolymer of piperylene and fumaronitrile, said copolymer consisting of from 30% to 50% by weight of copolymerized fumaronitrile, the balance thereof being copolymerized piperylene, said copolymer when molded being colorless, transparent and thermoplastic, and possessing an impact strength in excess of that of molded polystyrene.

RAYMOND B. SEYMOUR.

REFERENCES CITED

The following references are of record in the file of this patent:

UNITED STATES PATENTS

| Number | Name | Date |
|---|---|---|
| 2,168,535 | Nuesslein | Aug. 8, 1939 |
| 2,264,534 | Alder | Dec. 2, 1941 |
| 2,306,411 | Schoenfeld | Dec. 29, 1942 |
| 2,319,634 | Sauser | May 18, 1943 |
| 2,325,984 | Sarbach | Aug. 3, 1943 |

FOREIGN PATENTS

| Number | Country | Date |
|---|---|---|
| 14,556 | Great Britain | June 19, 1913 |
| 116,654 | Australia | Mar. 11, 1943 |
| 235,686 | Germany | June 19, 1911 |
| 842,186 | France | June 7, 1939 |
| 814,093 | France | June 14, 1937 |

OTHER REFERENCES

Harries: Annalen: 395, pages 243–5 (1913).